(12) United States Patent
Chan et al.

(10) Patent No.: US 10,839,048 B2
(45) Date of Patent: Nov. 17, 2020

(54) KEY-LADDER PROTECTED PERSONALIZATION DATA TRANSCRIPTION FOR PROVISIONING

(71) Applicant: ARRIS Enterprises LLC, Suwanee, GA (US)

(72) Inventors: Tat Keung Chan, San Diego, CA (US); Alexander Medvinsky, San Diego, CA (US)

(73) Assignee: ARRIS Enterprises LLC, Suwanee, GA (US)

(*) Notice: Subject to any disclaimer, the term of this patent is extended or adjusted under 35 U.S.C. 154(b) by 248 days.

(21) Appl. No.: 15/985,057

(22) Filed: May 21, 2018

(65) Prior Publication Data

US 2018/0336321 A1    Nov. 22, 2018

Related U.S. Application Data

(60) Provisional application No. 62/508,792, filed on May 19, 2017.

(51) Int. Cl.
| | |
|---|---|
| *G06F 21/10* | (2013.01) |
| *G06F 21/60* | (2013.01) |
| *H04L 9/08* | (2006.01) |
| *H04L 29/06* | (2006.01) |

(52) U.S. Cl.
CPC ............ *G06F 21/10* (2013.01); *G06F 21/602* (2013.01); *H04L 9/0822* (2013.01); *H04L 9/0861* (2013.01); *H04L 63/0428* (2013.01); *H04L 63/06* (2013.01); *H04L 63/062* (2013.01); *G06F 2221/2107* (2013.01); *G06F 2221/2121* (2013.01); *H04L 2463/061* (2013.01); *H04L 2463/062* (2013.01); *H04L 2463/101* (2013.01)

(58) Field of Classification Search
CPC ....................................................... G06F 21/10
USPC ............................................................ 726/26
See application file for complete search history.

(56) References Cited

U.S. PATENT DOCUMENTS

| | | | | |
|---|---|---|---|---|
| 5,347,465 | A * | 9/1994 | Ferreri ................... | G06F 30/39 716/54 |
| 6,076,166 | A * | 6/2000 | Moshfeghi ............. | G06Q 50/24 726/4 |
| 2010/0058047 | A1 * | 3/2010 | Medvinsky ............ | H04L 9/321 713/2 |
| 2010/0189262 | A1 * | 7/2010 | Ducharme ............ | G06F 21/602 380/277 |
| 2014/0010365 | A1 * | 1/2014 | Von Bokern .......... | H04L 9/0861 380/44 |
| 2015/0074399 | A1 * | 3/2015 | Nugent ............... | H04L 63/0428 713/168 |
| 2015/0082035 | A1 * | 3/2015 | Medvinsky ........... | G06F 16/951 713/168 |
| 2017/0012952 | A1 * | 1/2017 | Cocchi ................. | H04L 9/3263 |
| 2017/0346641 | A1 * | 11/2017 | Medvinsky ........... | H04L 9/0861 |
| 2018/0083933 | A1 * | 3/2018 | Mullen ............... | H04L 63/0478 |
| 2018/0145988 | A1 * | 5/2018 | Carson ................. | H04L 9/0822 |

(Continued)

*Primary Examiner* — Dant B Shaifer Harriman
(74) *Attorney, Agent, or Firm* — Chernoff, Vilhauer, McClung & Stenzel, LLP

(57) ABSTRACT

A method and system is provided that simplifies the key management by allowing personalization data protected for one chip model to be used to provision device with another chip model with different global hardware root keys. The solution minimizes the changes needed to be performed on the device during provisioning and remains secure.

19 Claims, 12 Drawing Sheets

(56) References Cited

U.S. PATENT DOCUMENTS

2019/0222878 A1* 7/2019 Cocchi .................. G06T 1/0021
2020/0004933 A1* 1/2020 Cocchi .................. G06F 21/572

* cited by examiner

KEY-LADDER PROTECTED PERSONALIZATION DATA TRANSCRIPTION FOR PROVISIONING

CROSS-REFERENCE TO RELATED APPLICATIONS

This application claims benefit of U.S. Provisional Patent Application No. 62/508,792, entitled "KEY-LADDER PROTECTED PERSONALIZATION DATA TRANSCRIPTION FOR PROVISIONING," by Tat Keung Chan and Alexander Medvinsky, filed May 19, 2017, which application is hereby incorporated by reference herein.

BACKGROUND

1. Field of the Invention

The present invention relates to systems and methods for supporting digital rights management, and in particular to a system and method for provisioning personalized data for use in such systems.

2. Description of the Related Art

Many digital rights management (DRM) systems require personalization data (DRM client keys) to be provisioned on a device such as a client device such as a Set-Top Box (STB) either in the factory or in the field. Such DRMs include, for example, high-bandwidth digital content protection (HDCP), digital transmission content protection (DTCP), NETFLIX, WIDEVINE DRM, and PLAYREADY.

Typically the STB is built on a System-On-Chip (SOC) that include a general purpose host processor (Host, or referred to as the Rich Execution Environment (REE)) and a secure processor that provides a Trusted Execution Environment (TEE). The DRM systems are implemented as a trusted application (TA) in the TEE.

To protect the personalization data, the personalization data is typically encrypted in such a way that only the corresponding TA in the TEE can decrypt. This can be accomplished, for example, using a multi-stage key ladder based on a hardware global root key to generate another global key and using that global key to encrypt the personalization data. This personalization data may be thus encrypted offline and packaged for delivery to the device.

Typically, the hardware global root key is chip-specific, and hence personalization data encrypted for devices using one model of chip cannot be decrypted by devices that use another model of chip. Accordingly, provisioning entities must manage the personalization data for SOCs or devices.

What is needed is a solution that allows personalization data that is encrypted for one chip model to be converted for provision and use on a device with a different chip model. This disclosure presents a solution to that need.

SUMMARY

To address the requirements described above, this document discloses a system and method for provisioning personalization data. One embodiment is evidenced by in a system comprising a first device having a first global root key GK_0 (A) and a second device having a second global root key GK_0 (B), wherein the method comprises (a) encrypting the personalization data according to a key (K); (b) computing a first global key GK_2(A) at least in part from the first global root key GK_0(A), a first global parameter Enc(GK_0(A), GK_1(A)), and a second global parameter Enc(GK_1(A), GK_2(A)); (c) computing a first intermediary global key GK_1(B) at least in part from the first global parameter Enc(GK_0(A), GK_1(A)), and the second global root key GK_0(B); (d) encrypting the first global key GK_2(A) with the first intermediary global key GK1_(B) to produce a transcribed second global parameter Enc(GK1_(B), GK_2(A)); (e) encrypting the key (K) according to the first global key GK_2(A); and (f) providing the encrypted key (K), the encrypted personalization data, the first global parameter, Enc(GK_0(A), GK_1(A)), and the transcribed second global parameter Enc(GK_1(B), GK_2 (A)) to the second device. Implementations may include one or more of the following features. The method described above where the personalization data provided to the second device comprises personalization data configured intended for use by the first device. The method described above, further comprising: (g) computing, in the second device, the first intermediary global key GK1_(B) at least in part from the first global parameter Enc(GK_0(A), GK_1(A)), and the second global root key GK_0(B); (h) decrypting, in the second device, the transcribed second global parameter Enc(GK1_(B), GK_2(A)) with the first intermediary global key GK_1(B) to produce the first global key GK_2(A); (i) decrypting, in the second device, the encrypted key (K) according to the first global key GK_2(A); and (j) decrypting, in the second device, the personalization data according to the key (K). Yet another embodiment is evidenced by means for performing the foregoing operations.

Another embodiment is evidenced by a system for provisioning personalization data generated for a first device having a first global root key GK_0 (A) to a second device having a second global root key GK_0 (B). The system includes a processor; and a memory, communicatively coupled to the processor, the memory storing instructions comprising instructions for: (a) encrypting the personalization data according to a key (K); (b) computing a first global key GK_2(A) at least in part from the first global root key GK_0(A), a first global parameter Enc(GK_0(A), GK_1 (A)), and a second global parameter Enc(GK_1(A), GK_2 (A)); (c) computing a first intermediary global key GK_1(B) at least in part from the first global parameter Enc(GK_0(A), GK_1(A)), and the second global root key GK_0(B); (d) encrypting the first global key GK_2(A) with the first intermediary global key GK1_(B) to produce a transcribed second global parameter Enc(GK1_(B), GK_2(A)); (e) encrypting the key (K) according to the first global key GK_2(A); and (f) providing the encrypted key (K), the encrypted personalization data, the first global parameter, Enc(GK_0(A), GK_1(A)), and the transcribed second global parameter Enc(GK_1(B), GK_2(A)) to the second device.

BRIEF DESCRIPTION OF THE DRAWINGS

Referring now to the drawings in which like reference numbers represent corresponding parts throughout.

DETAILED DESCRIPTION OF PREFERRED EMBODIMENTS

In the following description, reference is made to the accompanying drawings which form a part hereof, and which is shown, by way of illustration, several embodiments of the present invention. It is understood that other embodiments may be utilized and structural changes may be made without departing from the scope of the present invention.

Overview

The systems and methods described below simplify the key management by allowing personalization data protected for one chip model to be used to provision device with another chip model with different global hardware root keys. The solution minimizes the changes needed to be performed on the device during provisioning and remains secure.

Using Key Ladders to Provision Personalization Data

Figure 1:
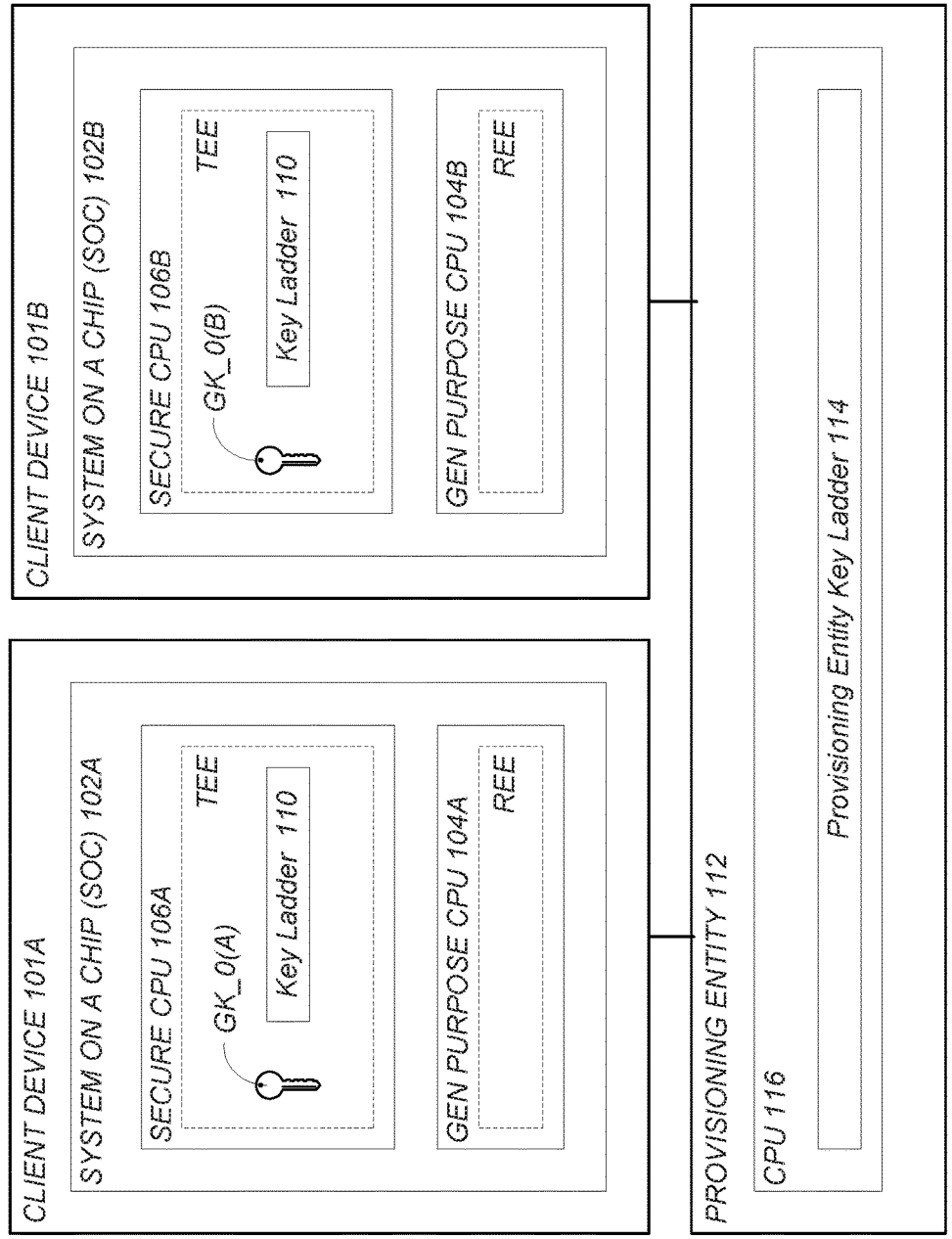
FIG. 1 is a diagram of a typical provisioning system.

FIG. 1 is a diagram of a typical provisioning system 100 comprising a first device such as STB 101A and a second device such as a second STB 101B (hereinafter alternatively referred to as STB(s) 101), both communicatively couple-able with a provisioning entity 112.

The first STB 101A and the second STB 101B each comprise a SOC 102. The first STB 101A includes an SOC 102A of a first type or model (for example, model A), and the second STB 101B includes an SOC 102B of a second type or model (for example model B) (also alternatively referred to hereinafter as SOC(s) 102). Each SOC 102 includes a secure CPU 106, with the first SOC 102A having a first secure CPU 106A and the second SOC 102B having a second secure CPU 106B (alternatively referred to hereinafter as secure CPU(s) 106). Each secure CPU 106 includes a communicatively coupled secure memory storing instructions for performing secure CPU operations. Secure CPU 106A of implements a first TEE and the secure CPU 106B implements a second and separate TEE. DRM related operations are performed in the TEE of each client device. Further, each SOC 102 implements a key ladder 110 using the secure CPU 106 of the related STB 101. In one embodiment, the same key ladder is implemented by the TEE in STBs 101A and 101B, but each key ladder 110 uses a different global root key GK_0, with the first secure CPU 106A using a first global root key GK_0(A), and the second CPU 106A using a second global root key GK_0(B). In one embodiment, the first global root key GK_0(A) and the second global root key GK_0(B) are tamper proof and/or hardware-based.

Each SOC 102 also comprises a general purpose host processor 104A, 104B (alternatively referred to hereinafter as host processor(s) or host CPU(s) 104). Each host CPU 104 includes a communicatively coupled general purpose processor memory storing instructions for performing secure CPU operations. These host CPUs 104 implement a Rich Execution Environment (REE). DRM systems are implemented at least in part using trusted applications (TAs) executed using the TEE of the device 101 implemented by the secure CPU 106 of the device, and may also be implemented at least in part by applications executed using the host CPU 104.

The provisioning entity 112 typically comprises a provisioning server that is used to provide personalization data and other information to the SOC 102 of each STB 101. The provisioning data may be provided in a factory environment or in the field after the STB 101 is deployed to the user.

To protect the personalization data, the data is typically encrypted in such a way that only a TA executed in the corresponding TEE by the secure CPU 106 can decrypt it and recover the personalization data for use. The encrypted personalization is then packaged offline and then delivered to the device in the factory or in the field. In one embodiment, this is accomplished by use of a global hardware-based root keys GK_0(A) and GK_0(B) of the associated secure CPU 106, the value of which is known to the provisioning entity 112.

For example, since the provisioning entity 112 knows the global hardware-based root key of the secure CPU 106, the provisioning entity 112 uses that global hardware-based root key along with a multi-stage key ladder 114 implemented by CPU 116 to encrypt the personalization data. That encrypted personalization data is provided to the SOC 102. Using the same global hardware-based root key, the secure CPU 106 decrypts the personalization data using a multi-stage secure key ladder 110 that is complementary to the multi-stage secure key ladder implemented by the provisioning entity. Each global root key is typically specific to the model of the SOC 102. Hence, personalization data encrypted for a particular model of SOC 102 (e.g. SOC A) can not be used on a different model SOC 102 (e.g. SOC B), even though both models of the SOC 102 are provided by the same vendor.

The systems and methods described below allow personalization data that was encrypted so as to be decrypted by the secure CPU 106A of one model SOC 102A with a particular global hardware-based root key to be decrypted by a secure CPU 106B of a different SOC 102B model having a different hardware-based global root key. This is accomplished by converting or transcribing global parameters used with the first model of the SOC 102A to so that they may be used with the second model SOC 102B to decrypt the encrypted personalization data. In one embodiment, this is accomplished by delivering different (transcribed data) to SOC 102B, while keeping the processing (including the key ladder 110) of that data the same for SOC 102B as the processing of data for SOC 102A.

Provisioning Personalization Data to a First Device

Figure 2:
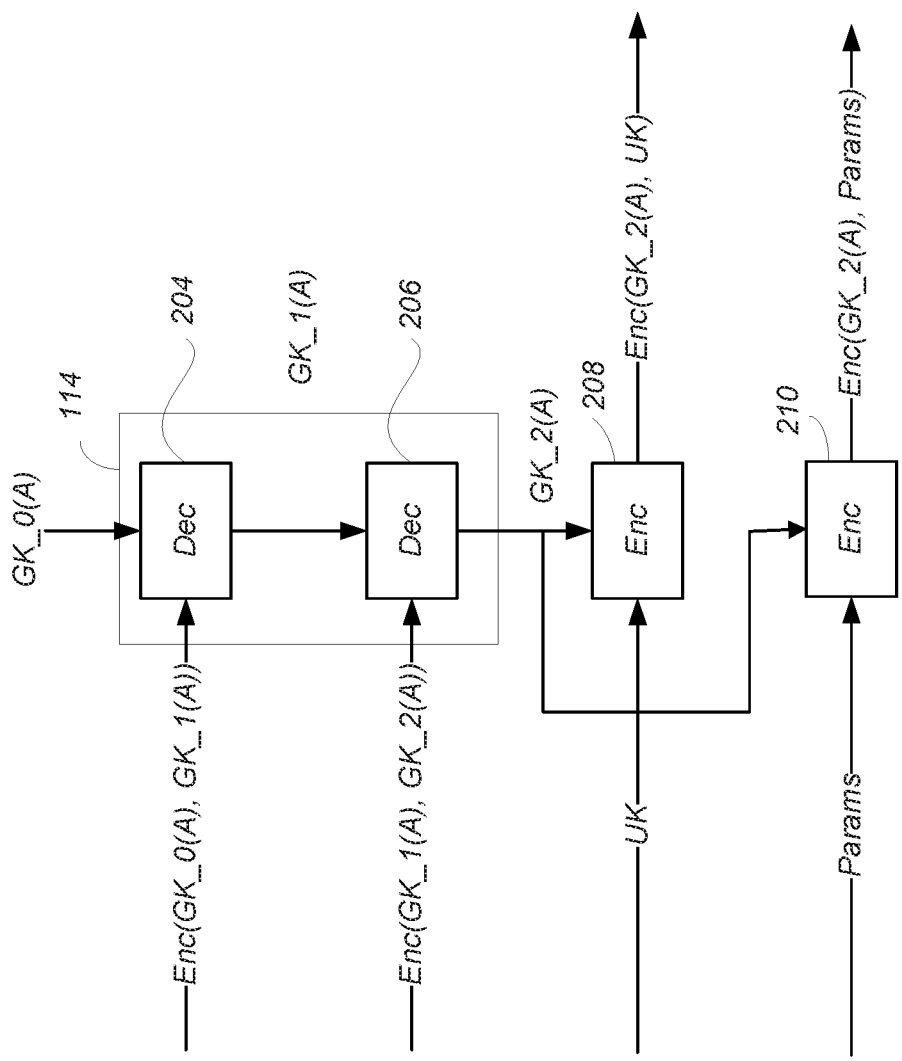
FIG. 2 is a diagram depicting an exemplary embodiment of a key ladder by the provisioning entity to protect the personalization data.

FIG. 2 is a diagram depicting an exemplary embodiment of a key ladder 114 by the provisioning entity 112 to protect the personalization data (PD). A global root key GK_0(A) is a hardware global root key stored or otherwise configured into the SOC 102A by the SOC 102A vendor. The global root key GK_0(A) may be implemented by storage in a secure memory with limited access (e.g. by the TEE), or may be implemented by burning or otherwise configuring a plurality of fuses that cannot be changed, again with access limited to the TEE. Hence, the global root key GK_0(A) is protected in the SOC 102 hardware and its use is restricted to be only accessible by a TA running on the TEE using the secure CPU 106A. The provisioning entity 112 has knowledge of the value of the global root key GK_0(A), and hence, can use this global key to protect the personalization data before provision to the SOC 102A, as described further below.

The multi-layer global key ladder 114 of the provisioning entity 112 is used to derive a final global key GK_N(A) using an N-layer key ladder. For illustration purpose, a two-layer key ladder 202 is depicted, but in practice, this portion of the key ladder 114 could be single-layer, or three or more layers as well. In each step of the key ladder 114, a global input parameter is used to derive the key for use by the next layer of the key ladder 114.

In the embodiment illustrated in FIG. 2, the global root key GK_0(A) is applied to a first decrypt operation 204 to decrypt a first global parameter Enc(GK_0(A), GK_1(A)), resulting in GK_1(A). GK_1(A) is then applied to a second decrypt operation 206 to decrypt a second global parameter Enc(GK_1(A), GK_2(A)), resulting in a derived global key GK_2(A). As described below, the derived global key GK_2 (A) is later used to encrypt a key (K) such as a random unique key (UK), PD, and other parameters.

Although global parameters Enc(GK_0(A), GK_1(A)) and Enc(GK_1(A), GK_2(A)) may be created from GK_1 (A) and GK_2(A) (for example, Enc(GK_0(A), GK_1(A)) created by encrypting GK_1(A) with GK_0(A) and Enc (GK_1(A), GK_2(A)) created by encrypting GK_2(A) with GK_1(A)), this need not be the case. Instead, global parameters Enc(GK_0(A), GK_1(A)) and Enc(GK_1(A), GK_2 (A)) may be generated randomly rather than created from GK_1(A) and GK_2(A). Further, decrypt operations 204 and 206 could be implemented by any symmetric crypto algorithm, or even different symmetric crypto algorithms. For illustration purpose, and advanced encryption standard (AES) decrypt operation is used.

For added security, the personalization data (PD) is not encrypted directly with the derived lobal key GK_2(A). Instead, the derived global key GK_2(A) is applied to encrypt operation 208 to encrypt a key (K). In one of the following disclosed embodiments, the key (K) comprises a random unique key (UK). As described further below, other unique parameters may be encrypted by the derived global key GK_2 as well, such as the parameters encrypted by encryption operation 210.

In one embodiment, decryption 204, 206 and encryption 208, 210 operations are performed by separate decryption and encryption modules respectively. In other embodiments, the decryption operations 204, 206 is performed in the same module, and the encryption operations 208, 210 is performed in the same module as well. The encryption and decryption modules may be implemented in hardware or software using a single processor.

Figure 3:
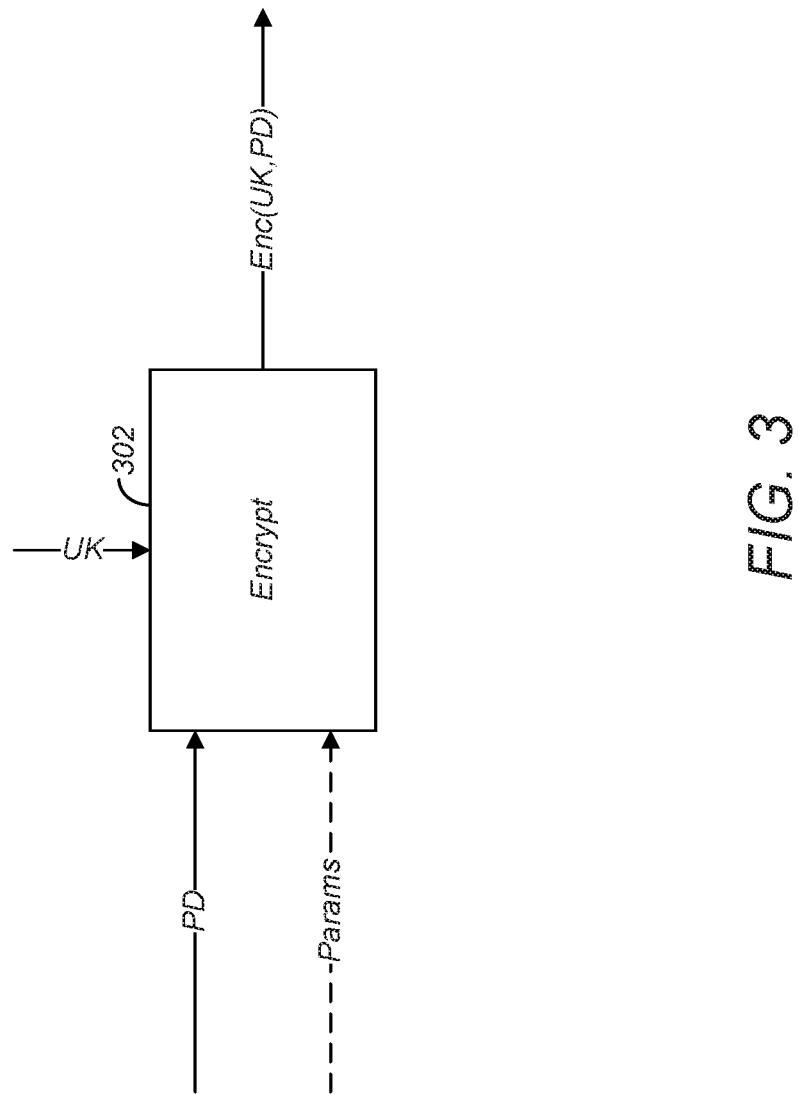
FIG. 3 is a diagram illustrating the encryption of the personalization data and other parameters.

FIG. 3 is a diagram illustrating the encryption of the personalization data and other parameters. As illustrated, the personalization data is encrypted by an encryption operation 302 to generate Enc(PD).

Some DRM schemes require the use of other parameters in the DRM process. For example, the cipher-block-chaining (CBC) and counter (CTR) modes of some AES algorithms require an initialization vector (IV). In cases where the protection of these parameters is desirable, these parameters may be encrypted by the derived global key GK_2(A). In such embodiments, both the UK and these parameters are encrypted by GK_2(A). More generally, there may be multiple sections of the personalization data, each section encrypted with the same UK or different UKs. The encrypted personalization data and data required to decrypt and use the personalization data (and the optional other parameters) is packaged and provided to the SOC 102A.

Figure 4:
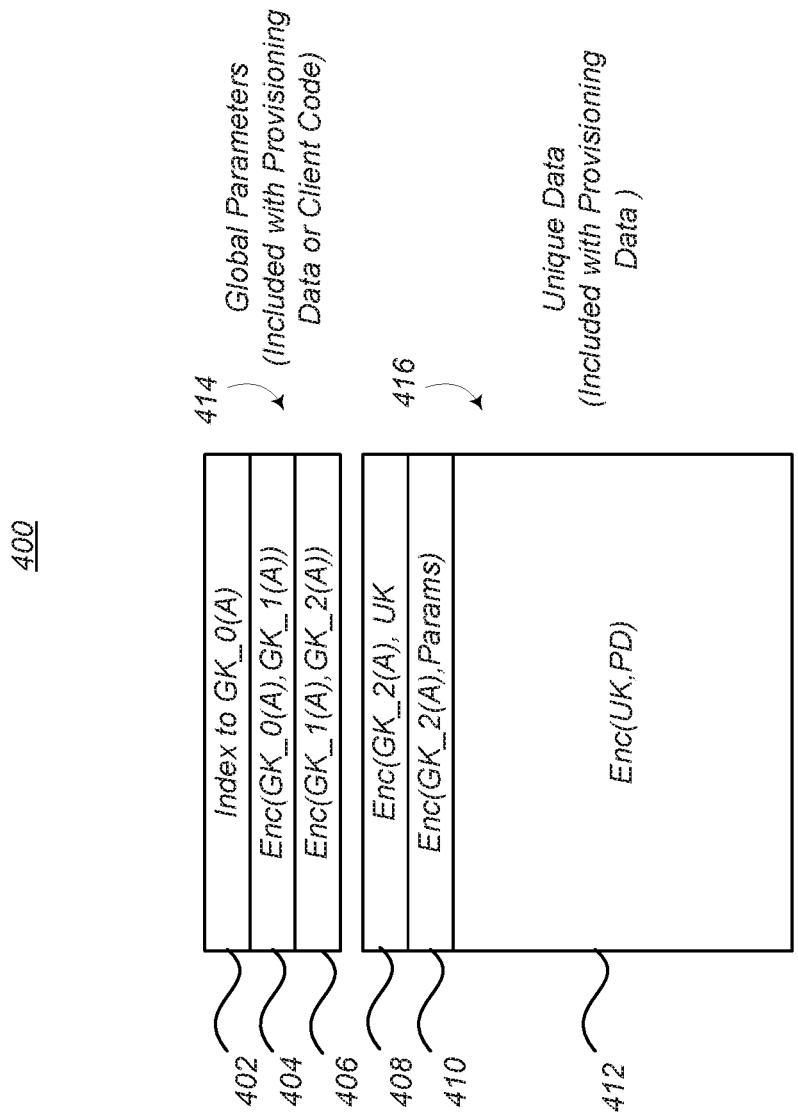
FIG. 4 is a diagram illustrating an exemplary embodiment of the packaged provisioning data.

FIG. 4 is a diagram illustrating an exemplary embodiment of the packaged provisioning data 400. The provisioning data 400 has unique data portion 416 and an optional global parameter portion 414. In embodiments where the global parameter portion 414 of the packaged provisioning data 400 is not included in the packaged provisioning data 400, the data of the global parameter portion 414 is provided to the STB 101 or SOC 102 by other means, for example, in the client code that processes the packaged provisioning data 400.

The global parameter portion 414 includes a first data segment 404 having the first global parameter Enc(GK_0 (A), GK_1(A)) and a second data segment 406 having the second global parameter Enc(GK_1(A), GK_2(A)). Of course, if longer key ladders are used, the optional global parameter portion 414-416 may include additional data. For example, if a three-level key ladder is used, a third global parameter Enc(GK_2(A), GK_3(A)) may be included with the global parameter portion 414, and the associated derived global key will be GK_3(A) instead of GK_2(A).

The mandatory unique data portion 416 includes a second data segment 406 having the UK encrypted by the derived global key GK_2(A) and a fourth data segment 412 having the PD encrypted by the UK. In embodiments wherein other parameters are required, such parameters encrypted by the derived global key GK_2(A) are included in a fifth data segment 410. In embodiments where the SOC 102A includes with multiple global root keys, (e.g. GK_0(A1), GK_0(A2), . . . , GK_0(AN)), an index to the key to be used with the packaged provisioning data 400 may also be included in a sixth data segment 402. In such cases, the index is used by the TEE to retrieve the global root key GK_0(AN) needed to recover the PD from the packaged provisioning data 400. In other embodiments of the packaged provisioning data 400, the same or analogous data is provided, but with the portions and segments of the provisioning data arranged or defined differently.

Recovery of the Personalization Data by the First Device

Figure 5:
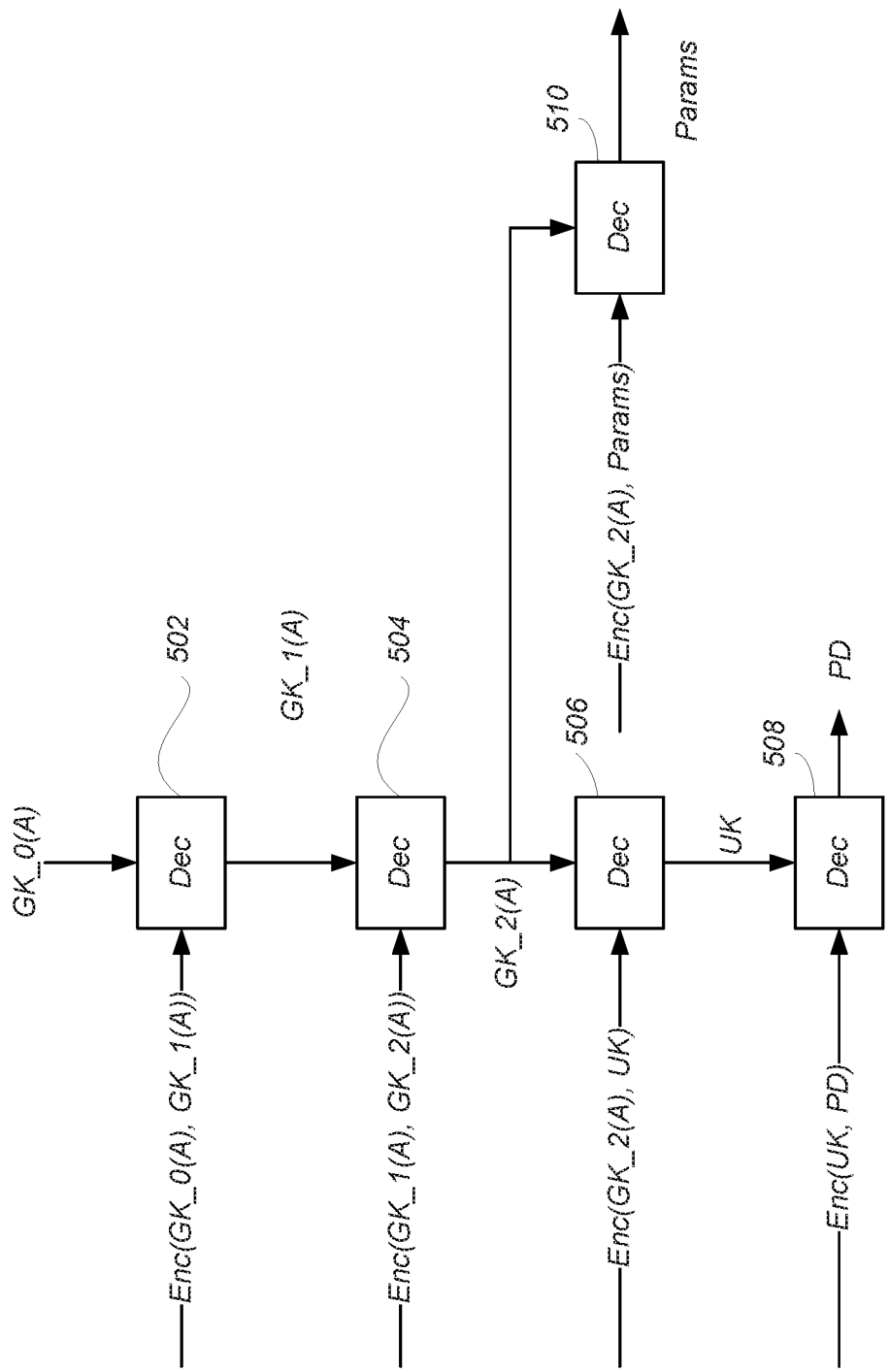
FIG. 5 is a diagram illustrating one embodiment of how the secure CPU processes the provisioning data to recover the personalization data and other optional parameters.

FIG. 5 is a diagram illustrating one embodiment of how the secure CPU 106A, operating in a TEE, processes the packaged provisioning data 400 to recover the personalization data and other optional parameters. The operations performed are complimentary to those performed by the provisioning entity 112 in generating the provisioning data, and are also based on the global root key GK_0(A). Hence, the global root key GK_0(A) of the secure CPU 106A is applied to a first decrypt operation 502 to decrypt the first global parameter Enc(GK_0(A), GK_1(A)) (obtained from the packaged provisioning data 400), resulting in GK_1(A). GK_1(A) is then applied to a second decrypt operation 504 to decrypt a second global parameter Enc(GK_1(A), GK_2

(A)) (also obtained from the packaged provisioning data), resulting in a derived global key GK_2 (A).

The derived global key GK_2(A) is used to decrypt the encrypted version of the random unique key UK by decryption operation 506, and the decrypted unique key UK is used to decrypt the encrypted personalization by decryption operation 508 to obtain the personalization data. The derived global key GK_2(A) is also used by decryption operation 510 to decrypt the encrypted parameters.

Provisioning Personalization Data

Generated for a First Device to a Second Device

The above scheme is based on a global root key GK_0(A) that is tied to a particular model SOC 102, for example, SOC 102A. Provisioning data processed for use with SOC 102A model A will not be usable on SOC 102B (which has global root key GK_0(B) or any other different SOC 102 model having a different global root key GK_0.

To allow provisioning data processed for use with SOC 102A to be usable by SOC 102B with minimum or zero required changes to STB 101 processing, the following transcription scheme is employed. This transcription method keeps the unique data portion 416 of the provisioning data the same by keeping the random unique key UK and the optional parameters the same. Also, to avoid any need to deliver the bottom level of the global key GK_2 (A) to the client, a new global parameter Enc(GK_1(B), GK_2(A)) that replaces Enc(GK_1(A), GK_2(A)) is generated offline in the infrastructure (e.g. by the provisioning entity 112 and used in its place. This change allows the same GK_2 (A) to be derived on the SOC 112B.

Figure 6:
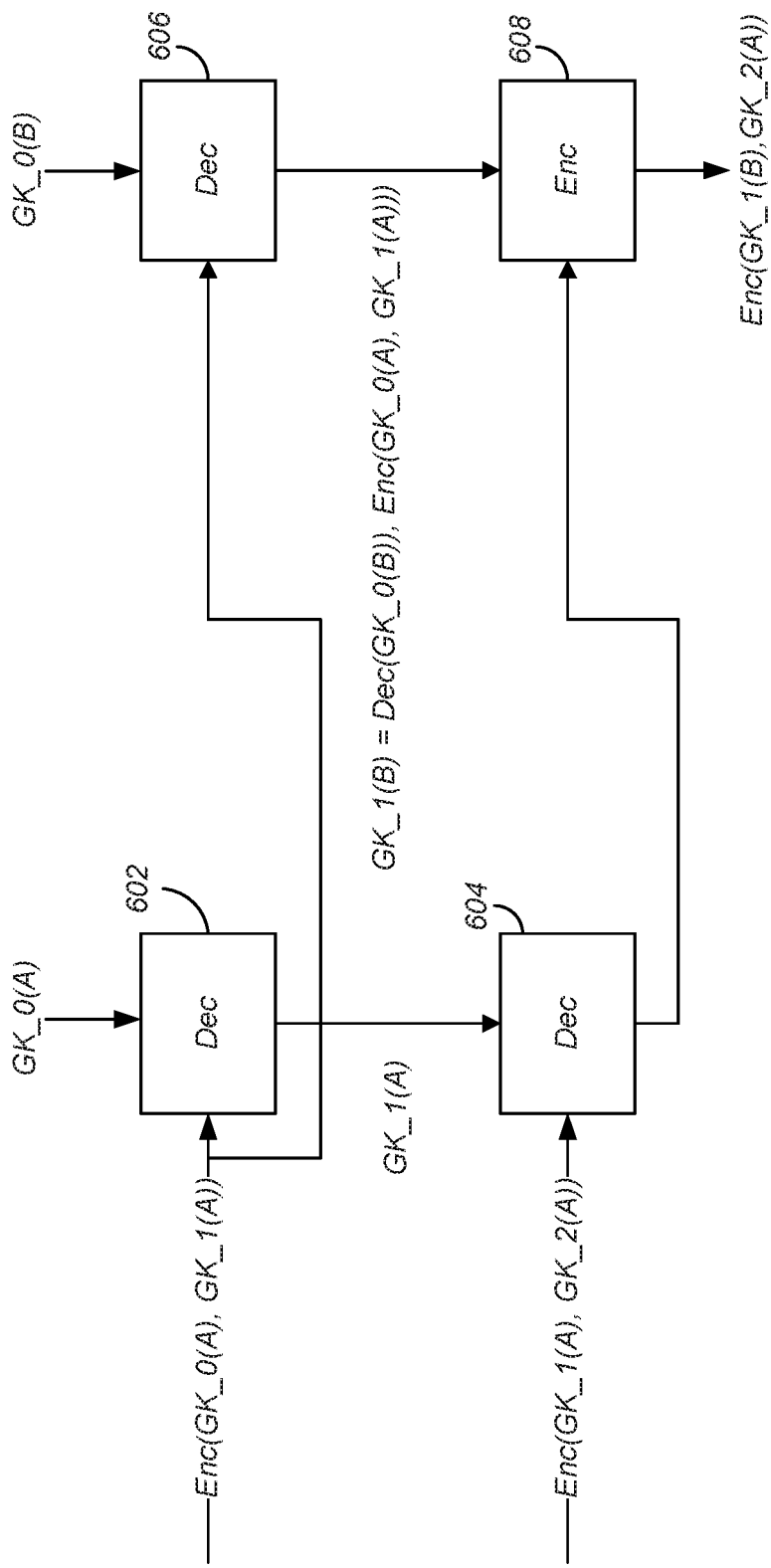
FIG. 6 is a diagram illustrating one embodiment of the generation of the provisioning data by the provisioning entity.

FIG. 6 is a diagram illustrating one embodiment of the generation of the transcribed global parameter by the provisioning entity 112. A first global key GK_2(A) is computed at least in part from the first global root key GK_0(A), a first global parameter Enc(GK_0(A), GK_1(A)), and a second global parameter Enc(GK_1(A), GK_2(A)). In the illustrated embodiment, this is accomplished by decrypting the first global parameter Enc(GK_0(A), GK_1(A)) with the first global root key GK_0(A) to produce a second intermediary global key GK_1(A) using decryption operation 602, and decrypting the second global parameter Enc(GK_1(A), GK_2(A)) with the second intermediary global key GK_1 (A) to produce the first global key GK_2(A) using decryption operation 604.

A first intermediary global key GK_1(B) is computed at least in part from the first global parameter Enc(GK_0(A), GK_1(A)), and the second global root key GK_0(B). In the illustrated embodiment, this is accomplished by decrypting the first global parameter Enc(GK_0(A), GK_1(A)) according to the second global root key GK_0(B) to produce the first intermediary global key GK1_(B) using decryption operation 606. The first global key GK_2(A) is encrypted by encryption operation 608 with the first intermediary global key GK1_(B) to produce a transcribed second global parameter Enc(GK1_(B), GK_2(A)).

The encrypted random unique key (UK) E(GK_2, UK), the encrypted personalization data E(UK, PD), the first global parameter, Enc(GK_0(A), GK_1(A)), and the second global parameter Enc(GK_1(A), GK_2(A)) is provided to the second device having the second global root key GK_0 (B). In addition, the transcribed second global parameter Enc(GK_1(B), GK_2(A)) is provided to the second device. The host CPU performs the transcription operation by replacing the second global parameter Enc(GK_1(A), GK_2 (A)) with the transcribed global parameter Enc(GK_1(B), GK_2(A)). The transcribed provisioning data is packaged in a data format analogous to that of packaged provisioning data 400, so that the secure CPU 106 of the SOC 102 performs the same operations on each portion of the data of the transcribed provisioning data as it would have on the packaged provisioning data 400. This is further illustrated in FIGS. 7 and 8 below.

Figure 7:
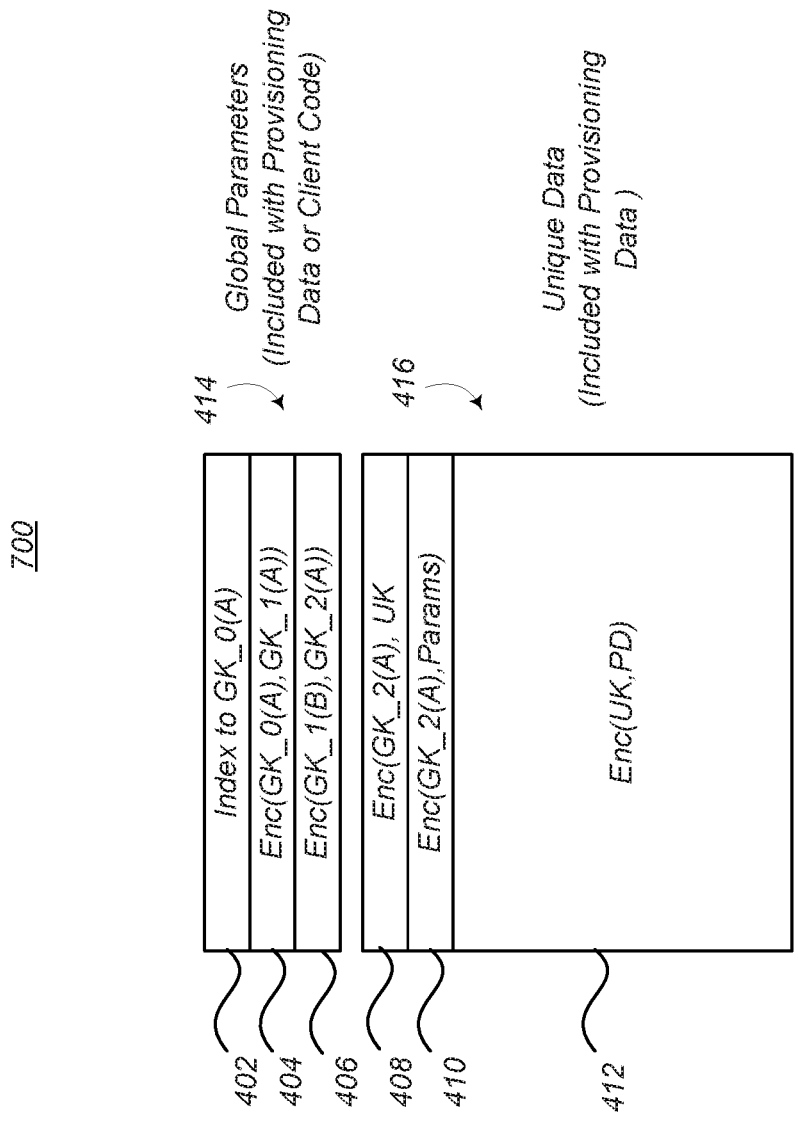
FIG. 7 is a diagram illustrating an exemplary embodiment of the packaged transcribed provisioning data.

FIG. 7 is a diagram illustrating an exemplary embodiment of the packaged transcribed provisioning data 700. As was true with the packaged provisioning data 400, the transcribed provisioning data 700 has unique data portion 416 and an optional global parameter portion 414. In embodiments where the global parameter portion 414 of the provisioning data 700 is not included in the provisioning data 700, the data of the global parameter portion 414 is provided to the STB 101 or SOC 102 by other means, for example, in the client code of the second device that processes the provisioning data 700.

As before, the global parameter portion 414 includes a first data segment 404 having the first global parameter Enc(GK_0, GK_1) and a second data segment 406. However, instead of the second global parameter Enc(GK_1, GK_2), the second data segment 406 includes the transcribed second global parameter Enc(GK1_(B), GK_2(A)). As was true with packaged provisioning data 400, if longer key ladders are used, the optional global parameter portion 414 may include additional data.

The mandatory unique data portion 416 includes the same data as packaged provisioning data 400, including a third data segment 408 having the UK encrypted by the derived global key GK_2 and a fourth data segment 412 having the PD encrypted by the UK. In embodiments wherein other parameters are required, such parameters encrypted by the derived global key GK_2 are included in a fifth data segment 410.

Again, in embodiments where the secure CPU 106 of SOC 102 model B includes with multiple global root keys, (e.g. GK_0(B1), GK_0(B2), . . . GK_0(BN)), an index to the key to be used with the provisioning data 700 may also be included in a sixth data segment 402. In such cases, the index is used by the secure CPU 106 executing in the TEE to retrieve the global root key GK_0(N) needed to recover the personalization data from the packaged provisioning data 700.

As was true with the packaged provisioning data 400, the same or analogous data is provided in different data segments of the packaged provisioning data 700, but with the portions and segments of the provisioning data arranged or defined differently. However, it is strongly preferred that the data structure of packaged provisioning data 700 for model B of the SOC 102 be the same as the data structure of the packaged provisioning data 400 for model A of the SOC 102, as this permits model B of the SOC 102 to perform the same operations on that received data without change, as described further with respect to FIG. 8 below.

Recovery of the Personalization Data by the Second Device

Figure 8:
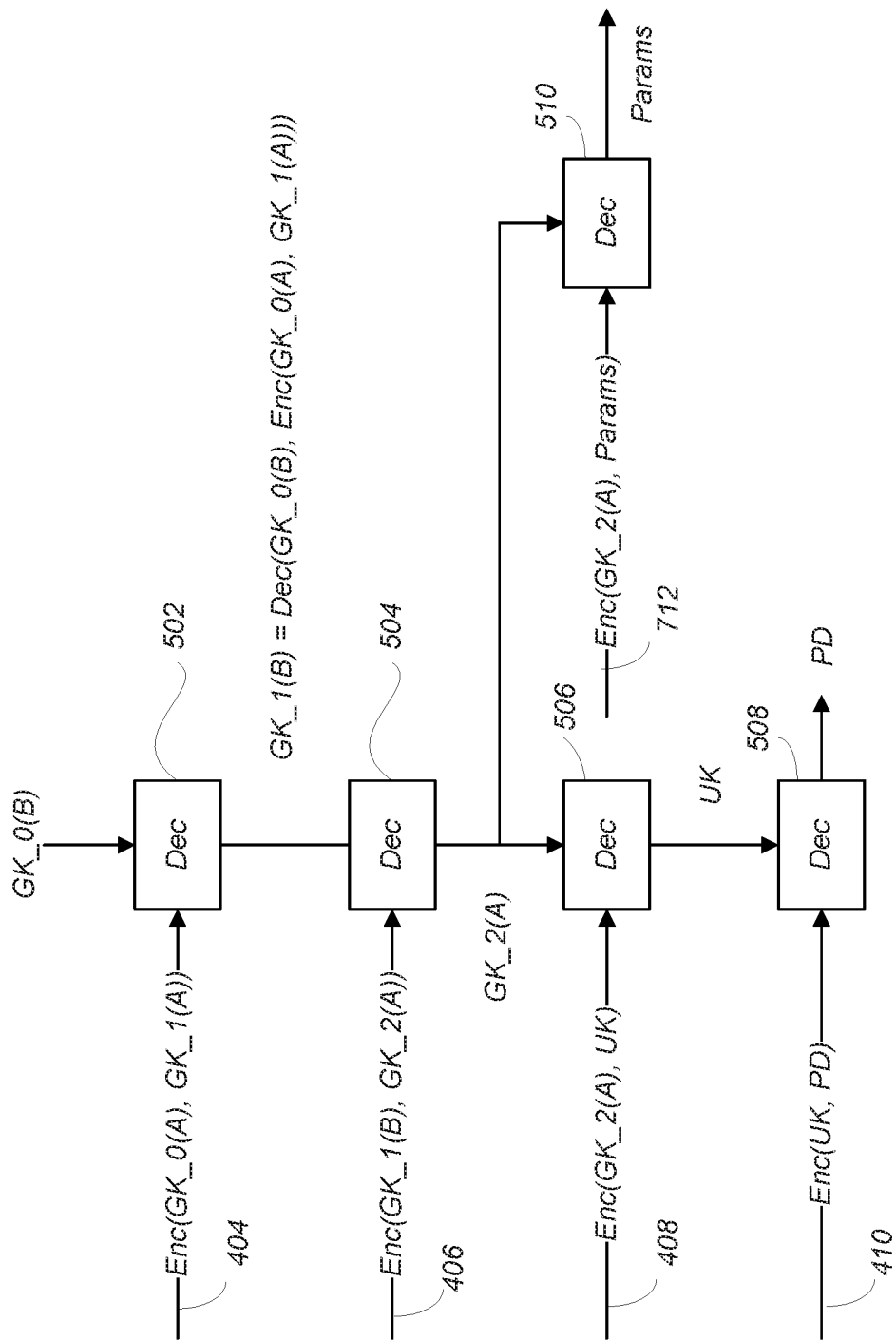
FIG. 8 is a diagram illustrating another embodiment of how the secure CPU processes the provisioning data to recover the personalization data and other optional parameters.

FIG. 8 is a diagram illustrating one embodiment of how the secure CPU 106B, operating in a TEE, processes the provisioning data 700 to recover the personalization data and other optional parameters. The operations performed (decryption operations 802-810) are same as those operations (decryption operations 502-510) performed by the secure CPU 106A of SOC 102A. However, since the numerical values applied to those operations differ from those provided to SOC 102A (since the data in second data segment 706 reflects the transcribed global parameter Enc (GK1_(B), GK_2(A)) instead of the second global parameter Enc(GK_1(A), GK_2(A)), the application this data to operations 502-510 results in the desired personalization data and parameters.

Turning now to FIG. 8, a first intermediary global key GK1_(B) is computed by the second device at least in part from the first global parameter Enc(GK_0(A), GK_1(A)), and the second global root key GK_0(B). In the illustrated embodiment, this is accomplished by decrypting the first global parameter Enc(GK_0(A), GK_1(A)) according to the second global root key GK_0(B) to produce the first intermediary global key GK_1(B) using decryption operation 502. The transcribed second global parameter Enc(GK1_(B), GK_2(A) is then decrypted by decryption operation 504 using the first intermediary global key GK_1(B) to produce the first global key GK_2(A). The first global key GK_2(A) is then used to decrypt the encrypted random unique key Enc(GK_2(A), UK) using decrypt operation 506 to produce the random unique key UK. The random unique key UK is then used to decrypt the personal data ID using decryption operation 508. The first global key GK_2(A) is also used to decrypt the encrypted parameters Enc(GK_2(A), params) (if any) using decryption operation 510. As described above, these operations are performed in the TEE of the secure processor 106 of the SOC 102.

Modification of Personalization Data

The process described above allows personalization data originally intended for a first device 101A having a first global hardware key GK_0(A) to be provisioned to a second device 101B having a second global hardware key GK_0(B) instead of the first global hardware key GK_0(A). Advantageously, this is made possible by transcribing a global parameter Enc(GK_0(A), GK_1(A) and including that transcribed global parameter Enc(GK1_(B), GK_2(A)) and providing that transcribed global parameter in the place of the global parameter Enc(GK_0(A) in the structure of the provisioning data.

However, there are cases where the personalization data generated for a user for the first device 101A differs from the personalization data needed for the same user for a second device 101B. For example, while the content of the personalization data may be the same for both the first device 101A and second device 101B for the same user, the required format for the data may differ.

In such cases, some or all of the personalization data may need to be modified before the personalization data used by the secure CPU 106A of device 101A can be used by the secure CPU 106B of device 101B. In such cases, the UK encryption must be removed to recover the personalization, so that such modifications can be made.

Figure 9:
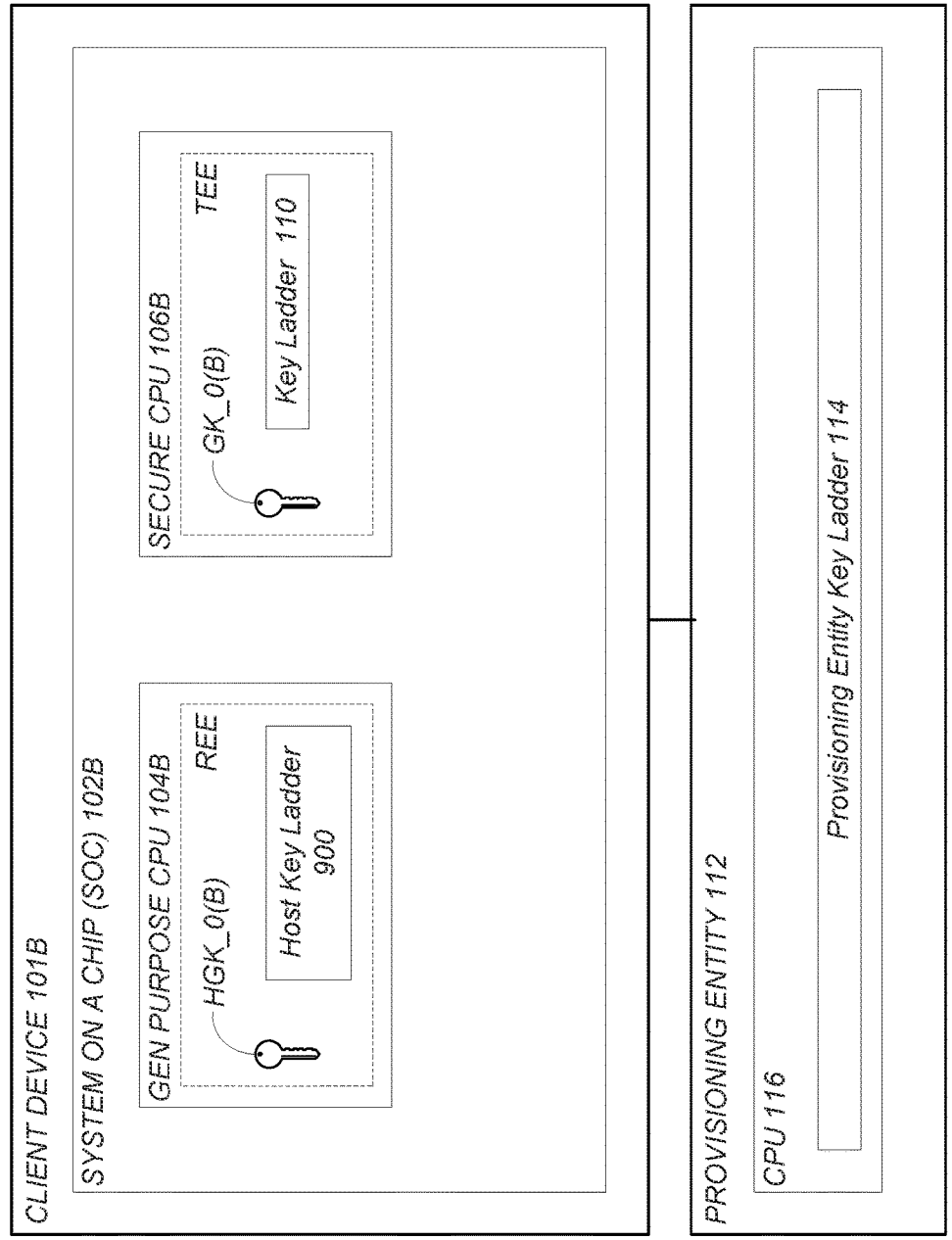
FIG. 9 is a diagram illustrating an embodiment of the second client device.

FIG. 9 is a diagram illustrating an embodiment of the second client device 101B. In this embodiment, the host CPU 104B of the second client device 101B, operating in a rich execution environment (REE) implements a host side key ladder 900. The general purpose CPU 104B is used to decrypt the encrypted personalization data Enc(UK, PD) according to the unique random key UK to obtain the unique random key UK.

Figure 10:
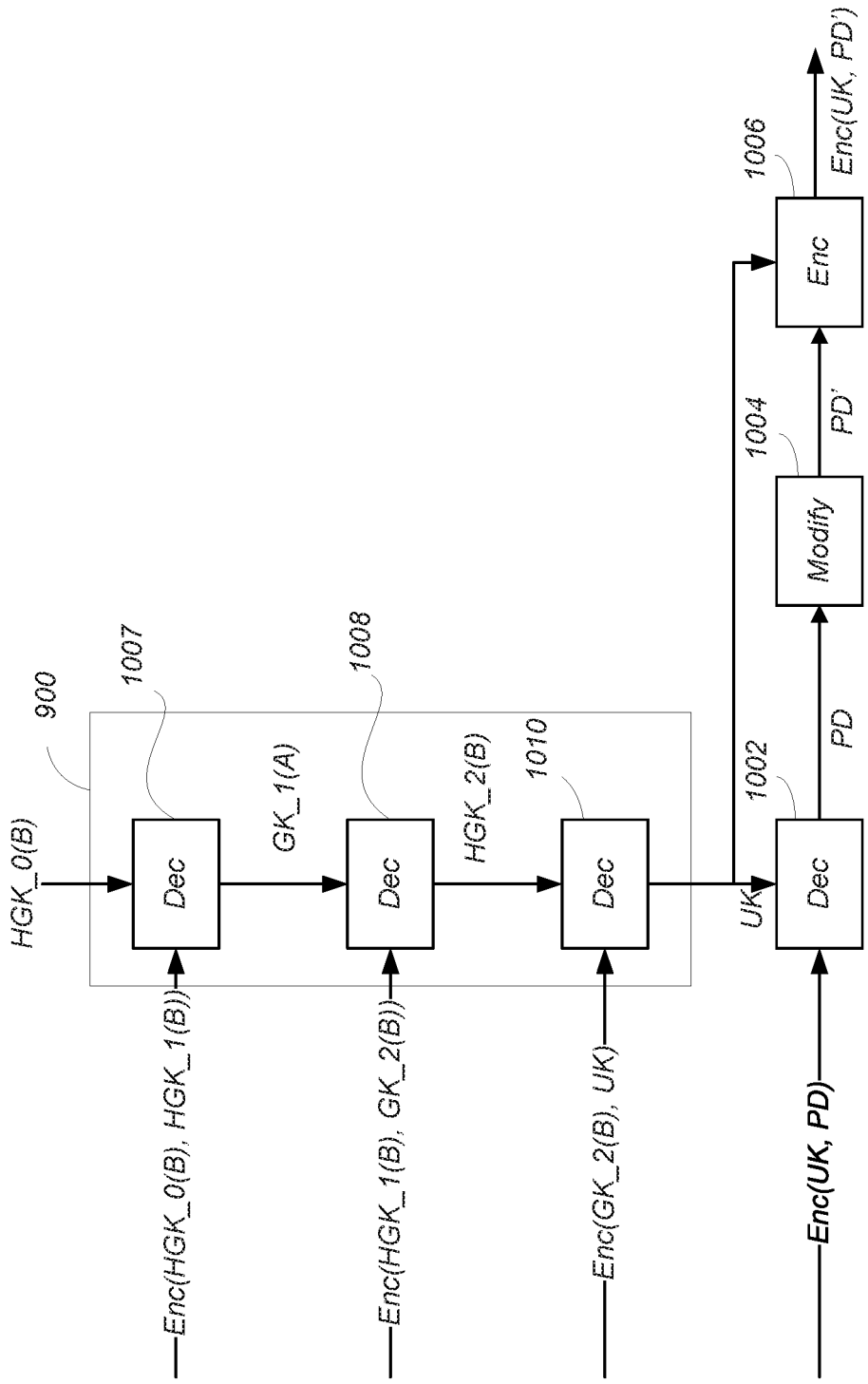
FIG. 10 is a diagram illustrating one embodiment the decryption of the encrypted personalization data by the host CPU.
Figure 11:
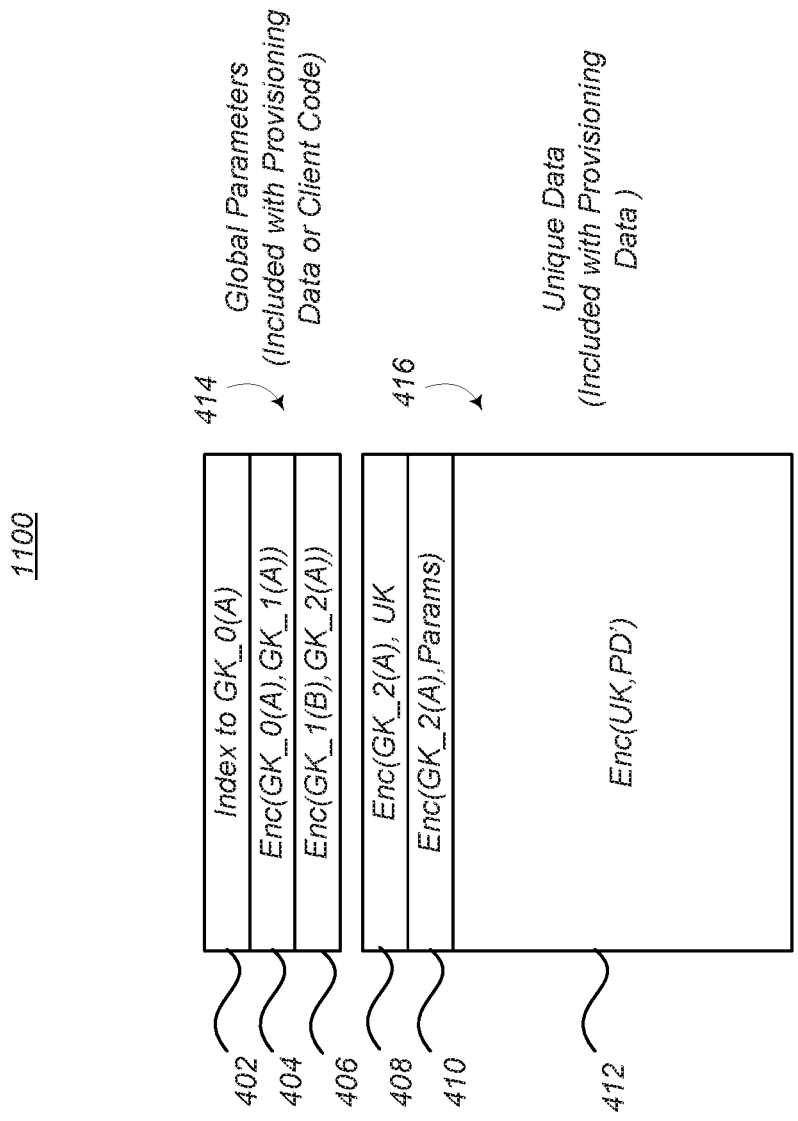
FIG. 11 is a diagram exemplary embodiment of the packaged transcribed provisioning data for the case wherein the personalization data has been modified.

FIG. 10 is a diagram illustrating one embodiment the decryption of the encrypted personalization data Enc(UK, PD) by the host CPU 106B. This is accomplished by decrypting the encrypted personalization data Enc(UK, PD) according to the unique key UK using decryption operation 1002 to obtain the personalization data PD. The personalization data is then modified by modification module 1004 to obtain modified personalization data PD'. As described above, such modification may include reformatting the personalization data or adding or subtracting other data. Then, the modified personalization data PD' is encrypted by encryption operation 1006 using the unique random key UK to produce Enc(UK, PD'). The modified and encrypted personalization data is then provided to the to the secure CPU 106A running the TEE, for example as personalization data 1100 as illustrated in FIG. 11. Note that the packaged provisioning data 1100 illustrated in FIG. 11 is the same as that of FIG. 7 above except that the encrypted modified personalization data Enc(UK, PD').

In order to decrypt the encrypted personalization data Enc(UK, PD), the unique random key UK must be obtained. In the illustrated embodiment, the unique random key UK is obtained by use of a host side key ladder 900. The host key ladder 900 is a secure hardware key ladder implemented by the general purpose CPU 104B of the SOC 102B second device 101B that can be invoked by the host CPU 106B. The actual keys in each stage of the host key ladder 900 are typically protected in hardware and therefore not directly accessible by the host CPU 106B meaning that all keys in the key ladder are not accessible in any general purpose memory (such as RAM) of the CPU or any flash memory. In other words, the keys are not easily readable by memory probing tools.

The host CPU 106B has a secure host hardware global root key HGK_0(B). A third global parameter Enc(HGK_0 (B), HGK_1(B)) and a fourth global parameter Enc(HGK_1 (B), GK_2(A)) are generated. Typically, this operation is performed off-line and is a one time operation for the particular SOC 102B model. The third global parameter Enc(HGK_0(B), HGK_1(B)) and a fourth global parameter Enc(HGK_1(B), GK_2(A)) are then provided to the second device 101B. This can be accomplished, for example, by embedding the third and fourth global parameters in factory provisioning software for performing the transcription. This software (and the global parameters that are included with it) may be deleted from the client device 101B before it leaves the factory.

Turning to the host key ladder 900, the third global parameter Enc(HGK_0(B), HGK_1(B)) is decrypted by decrypt operation 1007 according to the host processor global root key HGK_0(B) to generate a third intermediary global key HGK_1(B). That third intermediary global key HGK_1(B) is used by decryption operation 1008 to decrypt the fourth global parameter Enc(HGK_1(B), GK_2(A)) to generate the first global key GK_2(A). That first global key GK_2(A) is used by decrypt operation 1010 to decrypt the encrypted unique key Enc(GK_2(A), UK) to obtain the encrypted unique random key UK.

In this case, in addition to the transcription operations required to modify the personalization data, the host CPU 104B also overwrites the encrypted Enc(UK, PD) of the provisioned data 400 with the encrypted version of the personalization data Enc(UK, PD') to produce the packaged transcribed provisioning data.

FIG. 11 is a diagram exemplary embodiment of the packaged transcribed provisioning data 1100 for the case wherein the personalization data has been modified. In addition to the changes in the data content of the packaged provisioning data 700 shown in FIG. 7, (i.e. the changes from GK_0(A) to GK_0 (B) and from Enc(GK1_(A),GK_2 (A)) to Enc(GK_1(B), GK_2 (A)), part of the encrypted PD is also changed, specifically from Enc(UK, PD) to Enc(UK, PD'). This provisioning data 1100 is then passed from the host CPU to the secure CPU 106B for use by the TA of the TEE for decryption and processing Note that for illustration purpose, a three-layer key ladder 900 is used to protect the UK in the foregoing example. However, in practice, a one-layer, three or more layer key ladder 900 may be used as well. Note also that the UK is decrypted to the host side hardware key ladder 900, and is protected by host CPU 104B hardware and not decrypted to host CPU104B memory. In the foregoing example, the host side key ladder 900 includes four levels, including the decryption and encryption using the unique random key UK.

Hardware Environment

Figure 12:
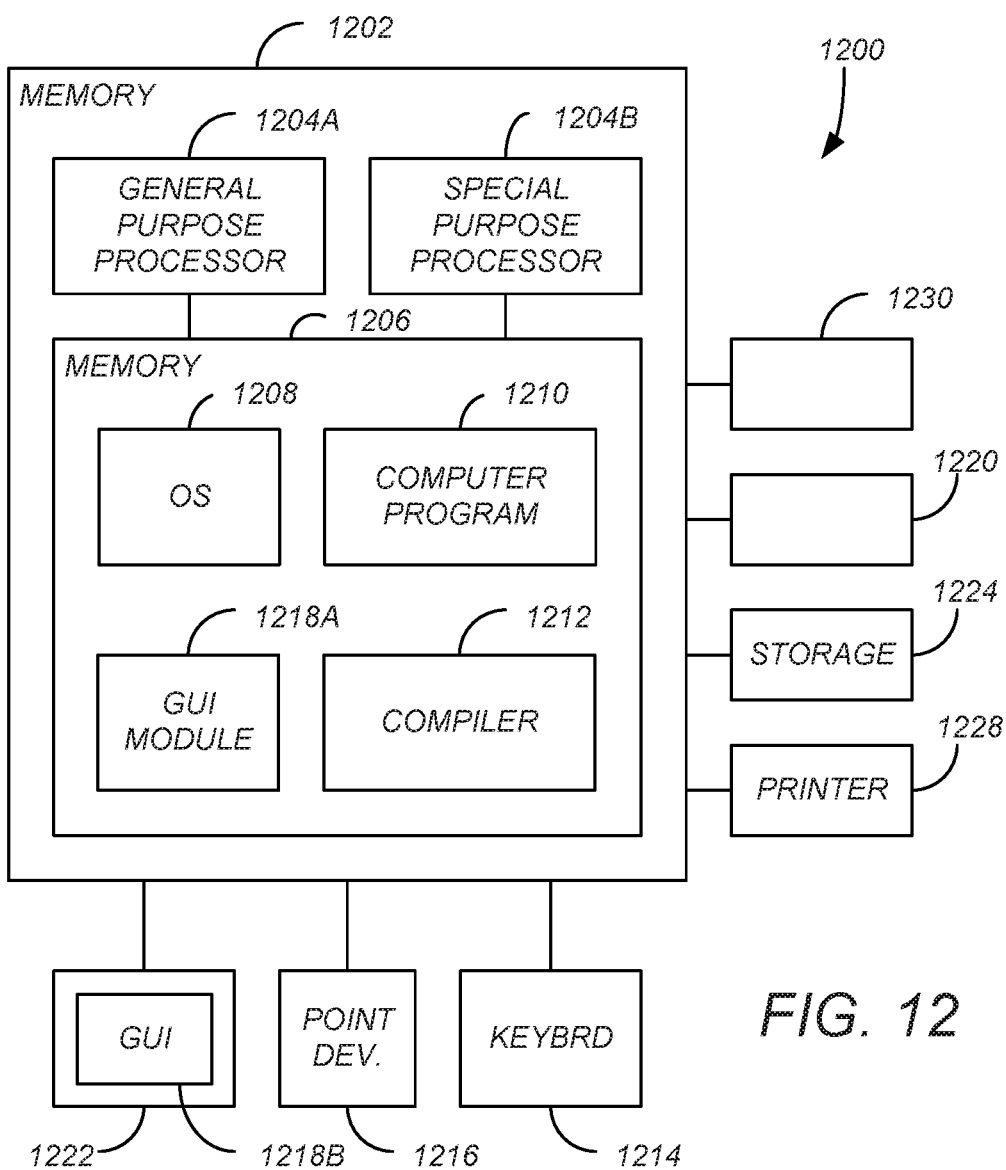
FIG. 12 is a diagram illustrating an exemplary computer system 1200 that could be used to implement elements of the present invention

FIG. 12 is a diagram illustrating an exemplary computer system 1200 that could be used to implement elements of the present invention, including the provisioning entity 112, the host CPU 104, secure CPU 106. The computer 1202 comprises a general purpose hardware processor 1204A and/or a special purpose hardware processor 1204B (hereinafter alternatively collectively referred to as processor 1204) and a memory 1206, such as random access memory (RAM). The computer 1202 may be coupled to other devices, including input/output (I/O) devices such as a keyboard 1214, a mouse device 1216 and a printer 1228.

In one embodiment, the computer 1202 operates by the general purpose processor 1204A performing instructions defined by the computer program 1210 under control of an operating system 1208. The computer program 1210 and/or the operating system 1208 may be stored in the memory 1206 and may interface with the user and/or other devices to accept input and commands and, based on such input and commands and the instructions defined by the computer program 1210 and operating system 1208 to provide output and results.

Output/results may be presented on the display 1222 or provided to another device for presentation or further processing or action. In one embodiment, the display 1222 comprises a liquid crystal display (LCD) having a plurality of separately addressable pixels formed by liquid crystals. Each pixel of the display 1222 changes to an opaque or translucent state to form a part of the image on the display in response to the data or information generated by the processor 1204 from the application of the instructions of the computer program 1210 and/or operating system 1208 to the input and commands. Other display 1222 types also include picture elements that change state in order to create the image presented on the display 1222. The image may be provided through a graphical user interface (GUI) module 1218A. Although the GUI module 1218A is depicted as a separate module, the instructions performing the GUI 1218B functions can be resident or distributed in the operating system 1208, the computer program 1210, or implemented with special purpose memory and processors.

Some or all of the operations performed by the computer 1202 according to the computer program 1210 instructions may be implemented in a special purpose processor 1204B. In this embodiment, some or all of the computer program 1210 instructions may be implemented via firmware instructions stored in a read only memory (ROM), a programmable read only memory (PROM) or flash memory within the special purpose processor 1204B or in memory 1206. The special purpose processor 1204B may also be hardwired through circuit design to perform some or all of the operations to implement the present invention. Further, the special purpose processor 1204B may be a hybrid processor, which includes dedicated circuitry for performing a subset of functions, and other circuits for performing more general functions such as responding to computer program instructions. In one embodiment, the special purpose processor is an application specific integrated circuit (ASIC).

The computer 1202 may also implement a compiler 1212 which allows an application program 1210 written in a programming language such as COBOL, C++, FORTRAN, or other language to be translated into processor 1204 readable code. After completion, the application or computer program 1210 accesses and manipulates data accepted from I/O devices and stored in the memory 1206 of the computer 1202 using the relationships and logic that was generated using the compiler 1212.

The computer 1202 also optionally comprises an external communication device such as a modem, satellite link, Ethernet card, or other device for accepting input from and providing output to other computers.

In one embodiment, instructions implementing the operating system 1208, the computer program 1210, and/or the compiler 1212 are tangibly embodied in a computer-readable medium, e.g., data storage device 1220, which could include one or more fixed or removable data storage devices, such as a zip drive, floppy disc drive 1224, hard drive, CD-ROM drive, tape drive, or a flash drive. Further, the operating system 1208 and the computer program 1210 are comprised of computer program instructions which, when accessed, read and executed by the computer 1202, causes the computer 1202 to perform the steps necessary to implement and/or use the present invention or to load the program of instructions into a memory, thus creating a special purpose data structure causing the computer to operate as a specially programmed computer executing the method steps described herein. Computer program 1210 and/or operating instructions may also be tangibly embodied in memory 1206 and/or data communications devices 1230, thereby making a computer program product or article of manufacture according to the invention. As such, the terms "article of manufacture," "program storage device" and "computer program product" or "computer readable storage device" as used herein are intended to encompass a computer program accessible from any computer readable device or media.

Of course, those skilled in the art will recognize that any combination of the above components, or any number of different components, peripherals, and other devices, may be used with the computer 1202.

Although the term "computer" is referred to herein, it is understood that the computer may include portable devices such as cellphones, portable MP3 players, video game consoles, notebook computers, pocket computers, or any other device with suitable processing, communication, and input/output capability.

CONCLUSION

This concludes the description of the preferred embodiments of the present invention. The foregoing description of the preferred embodiment of the invention has been presented for the purposes of illustration and description. It is not intended to be exhaustive or to limit the invention to the precise form disclosed. Many modifications and variations are possible in light of the above teaching.

It is intended that the scope of the invention be limited not by this detailed description, but rather by the claims appended hereto. The above specification, examples and data provide a complete description of the manufacture and use of the apparatus and method of the invention. Since many embodiments of the invention can be made without departing from the scope of the invention, the invention resides in the claims hereinafter appended.

What is claimed is:

1. A method of provisioning personalization data in a system comprising a first device having a first global root key GK_0 (A) and a second device having a second global root key GK_0 (B), the method comprising:
   (a) encrypting the personalization data according to a key (K);
   (b) computing a first global key GK_2(A) at least in part from the first global root key GK_0(A), a second intermediary global key GK_1(A), a first global parameter Enc(GK_0(A), GK_1(A)), and a second global parameter Enc(GK_1(A), GK_2(A)),
      wherein the first global parameter Enc(GK_0(A), GK_1(A)) is created by encrypting the second intermediary global key GK_1(A) with the first global root key GK_0(A), and
      wherein the second global parameter Enc(GK_1(A), GK_2(A)) is created by encrypting the first global key GK_2(A) with the second intermediary global key GK_1(A);
   (c) computing a first intermediary global key GK_1(B) at least in part from the first global parameter Enc(GK_0 (A), GK_1(A)), and the second global root key GK_0 (B);
   (d) encrypting the first global key GK_2(A) with the first intermediary global key GK1_(B) to produce a transcribed second global parameter Enc(GK1_(B), GK_2 (A));
   (e) encrypting the key (K) according to the first global key GK_2(A); and
   (f) providing the encrypted key (K), the encrypted personalization data, the first global parameter, Enc(GK_0 (A), GK_1(A)), and the transcribed second global parameter Enc(GK_1(B), GK_2(A)) to the second device.

2. The method of claim 1, wherein:
   the key (K) comprises a random unique key (UK); and
   the personalization data provided to the second device comprises personalization data configured intended for use by the first device.

3. The method of claim 2, wherein:
   the first global parameter, Enc(GK_0(A), GK_1(A)), encrypted random unique key (UK) and the encrypted personalization data are at least a part of provisioning data provisioned to the second device; and
   the transcribed second global parameter Enc(GK_1(B), GK_2(A)) are provided to the second device within client code of the second device.

4. The method of claim 2, wherein:
   computing the first global key GK_2(A) at least in part from the first global root key GK_0(A), the first global parameter Enc(GK_0(A), GK_1(A)), and the second global parameter Enc(GK_1(A), GK_2(A)) comprises:
      decrypting the first global parameter Enc(GK_0(A), GK_1(A)) with the first global root key GK_0(A) to produce a second intermediary global key GK_1(A); and
      decrypting the second global parameter Enc(GK_1(A), GK_2(A)) with the second intermediary global key GK_1(A) to produce the first global key GK_2(A); and computing a first intermediary global key GK_1(B) at least in part from the first global parameter Enc(GK_0 (A), GK_1(A)), and the second global root key GK_0 (B) comprises:
      decrypting the first global parameter Enc(GK_0(A), GK_1(A)) according to the second global root key GK_0(B) to produce the first intermediary global key GK1_(B).

5. The method of claim 2, wherein:
   the second global root key GK_0(B) is one of a plurality of second global root keys of the second device; and
   the method further comprises:
      providing an index to the second global root key GK_0(B) to the second device.

6. The method of claim 2, further comprising:
   provisioning the first device with the first global parameter Enc(GK_0(A), GK_1(A)), the encrypted random unique key (UK), the second global parameter Enc (GK_1(A), GK_2(A)), and the encrypted personalization data.

7. The method of claim 2, further comprising:
   (g) computing, in the second device, the first intermediary global key GK1_(B) at least in part from the first global parameter Enc(GK_0(A), GK_1(A)), and the second global root key GK_0(B);
   (h) decrypting, in the second device, the transcribed second global parameter Enc(GK1_(B), GK_2(A)) with the first intermediary global key GK_1(B) to produce the first global key GK_2(A);
   (i) decrypting, in the second device, the encrypted random unique key (UK) according to the first global key GK_2(A); and
   (j) decrypting, in the second device, the personalization data according to the random unique key (UK).

8. The method of claim 7, wherein:
   (g)-(j) is performed by a secure processor of the second device in a trusted execution environment.

9. The method of claim 8, further comprising:
   (k) decrypting, in the second device, the encrypted personalization data according to the unique key (UK);
   (l) modifying, in the second device, the personalization data to configure the personalization data for the second device; and
   (m) encrypting, in the second device, the modified personalization data according to the unique key (UK).

10. The method of claim 9, wherein:
    (k)-(m) is performed by a general purpose processor of the second device in a rich execution environment.

11. The method of claim 10, wherein:
    the second device further comprises a host processor global root key HGK_0;
    a third global parameter Enc(HGK_0(B), HGK_1(B)) and a fourth global parameter Enc(HGK_1(B), GK_2(A)) are provided to the second device;
    decrypting, in the second device, the encrypted personalization data according to the unique key (UK) comprises:
       decrypting the third global parameter Enc(HGK_0(B), HGK_1(B)) according to the host processor global root key HGK_0(B) to generate a third intermediary global key HGK_1(B);
       decrypting the fourth global parameter Enc(HGK_1(B), GK_2(A)) with the intermediary global key HGK_1(B) to produce the first global key GK_2(A); and
       decrypting the encrypted random unique key (UK) according to the first global key GK_2(A) to produce the unique key (UK).

12. A system for provisioning personalization data generated for a first device having a first global root key GK_0 (A) to a second device having a second global root key GK_0 (B), comprising
a processor; and
a memory, communicatively coupled to the processor, the memory storing instructions comprising instructions for:
(a) encrypting the personalization data according to a key (K);
(b) computing a first global key GK_2(A) at least in part from the first global root key GK_0(A), a second intermediary global key GK_1(A), a first global parameter Enc(GK_0(A), GK_1(A)), and a second global parameter Enc(GK_1(A), GK_2(A)))),
wherein the first global parameter Enc(GK_0(A), GK_1(A)) is created by encrypting the second intermediary global key GK_1(A) with the first global root key GK_0(A), and
wherein the second global parameter Enc(GK_1(A), GK_2(A)) is created by encrypting the first global key GK_2(A) with the second intermediary global key GK_1(A);
(c) computing a first intermediary global key GK_1(B) at least in part from the first global parameter Enc(GK_0 (A), GK_1(A)), and the second global root key GK_0 (B);
(d) encrypting the first global key GK_2(A) with the first intermediary global key GK1_(B) to produce a transcribed second global parameter Enc(GK1_(B), GK_2 (A));
(e) encrypting the key (K) according to the first global key GK_2(A); and
(f) providing the encrypted key (K), the encrypted personalization data, the first global parameter, Enc(GK_0 (A), GK_1(A)), and the transcribed second global parameter Enc(GK_1(B), GK_2(A)) to the second device.
13. The system of claim 12, wherein:
the key (K) comprises a random unique key (UK); and
the first global parameter, Enc(GK_0(A), GK_1(A)), the encrypted random unique key (UK) and the encrypted personalization data are at least a part of provisioning data provisioned to the second device; and
the transcribed second global parameter Enc(GK_1(B), GK_2(A)) are provided to the second device within client code of the second device.
14. The system of claim 12, wherein:
the instructions for computing the first global key GK_2 (A) at least in part from the first global root key GK_0(A), the first global parameter Enc(GK_0(A), GK_1(A)), and the second global parameter Enc(GK_1 (A), GK_2(A)) comprise instructions for:
decrypting the first global parameter Enc(GK_0(A), GK_1(A)) with the first global root key GK_0(A) to produce a second intermediary global key GK_1(A); and
decrypting the second global parameter Enc(GK_1(A), GK_2(A)) with the second intermediary global key GK_1(A) to produce the first global key GK_2(A); and
the instructions for computing a first intermediary global key GK_1(B) at least in part from the first global parameter Enc(GK_0(A), GK_1(A)), and the second global root key GK_0(B) comprise instructions for:
decrypting the first global parameter Enc(GK_0(A), GK_1(A)) according to the second global root key GK_0(B) to produce the first intermediary global key GK1_(B).
15. The system of claim 12, wherein:
the second global root key GK_0(B) is one of a plurality of second global root keys of the second device; and
the instructions further comprise instructions for:
providing an index to the second global root key GK_0(B) to the second device.
16. The system of claim 12, wherein the instructions further comprise instructions for:
provisioning the first device with the first global parameter Enc(GK_0(A), GK_1(A)), the encrypted random unique key (UK), the second global parameter Enc (GK_1(A), GK_2(A)), and the encrypted personalization data.
17. The system of claim 12, wherein:
the second device comprises a secure processor communicatively coupled to a secure processor memory storing secure processor instructions comprising instructions for:
(g) computing, in the second device, the first intermediary global key GK1_(B) at least in part from the first global parameter Enc(GK_0(A), GK_1(A)), and the second global root key GK_0(B);
(h) decrypting, in the second device, the transcribed second global parameter Enc(GK1_(B), GK_2(A)) with the first intermediary global key GK_1(B) to produce the first global key GK_2(A);
(i) decrypting, in the second device, the encrypted random unique key (UK) according to the first global key GK_2(A); and
(j) decrypting, in the second device, the personalization data according to the random unique key (UK).
18. The system of claim 17, wherein:
the second device comprises a general purpose processor communicatively coupled to a general purpose processor memory storing general purpose processor instructions comprising instructions for:
(k) decrypting, in the second device, the encrypted personalization data according to the unique key (UK);
(l) modifying, in the second device, the personalization data to configure the personalization data for the second device; and
(m) encrypting, in the second device, the modified personalization data according to the unique key (UK).
19. The system of claim 18, wherein:
the second device further comprises a second processor global root key HGK_0;
a third global parameter Enc(HGK_0(B), HGK_1(B)) and a fourth global parameter Enc(HGK_1(B), GK_2(A)) are provided to the second device;
the general purpose processor instructions for decrypting, in the second device, the encrypted personalization data according to the unique key (UK) comprise general purpose processor instructions for:
decrypting the third global parameter Enc(HGK_0(B), HGK_1(B)) according to the second processor global root key HGK_0(B) to generate a third intermediary global key HGK_1(B);
decrypting the fourth global parameter Enc(HGK_1 (B), GK_2(A)) with the intermediary global key HGK_1(B) to produce the first global key GK_2(A); and decrypting the encrypted random unique key (UK) according to the first global key GK_2(A) to produce the unique key (UK).

\* \* \* \* \*